United States Patent
Yeh (10) Patent No.: US 7,215,720 B2
(45) Date of Patent: May 8, 2007

(54) METHOD FOR COMPENSATING BASELINE WANDER OF A TRANSMISSION SIGNAL AND RELATED CIRCUIT

(75) Inventor: Tse-Hsien Yeh, Taipei (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 737 days.

(21) Appl. No.: 10/065,909

(22) Filed: Nov. 28, 2002

(65) Prior Publication Data
US 2003/0107423 A1    Jun. 12, 2003

(30) Foreign Application Priority Data
Dec. 6, 2001    (TW) .............................. 90130252 A (51) Int. Cl.
*H04L 25/06*    (2006.01)
(52) U.S. Cl. .................................... 375/317
(58) Field of Classification Search ................. 375/316, 375/317
See application file for complete search history.

(56) References Cited

U.S. PATENT DOCUMENTS

| 5,519,667 | A | * | 5/1996 | Harston ...................... 365/235 |
| 5,880,615 | A | | 3/1999 | Bazes |
| 6,038,266 | A | * | 3/2000 | Lee et al. ................... 375/317 |
| 6,044,489 | A | | 3/2000 | Hee et al. |
| 6,047,026 | A | * | 4/2000 | Chao et al. ................. 375/233 |

* cited by examiner

*Primary Examiner*—Kevin Burd
(74) *Attorney, Agent, or Firm*—Winston Hsu (57) ABSTRACT

A method for compensating a baseline wander of a transmission signal and related circuit are provided. The transmission signal includes a plurality of first pulses and a plurality of second pulses for representing digital data coded in the transmission signal. The method includes generating an accumulation result according to a number of the first pulses and a number of the second pulses for estimating the baseline wander of the transmission signal, and compensating the baseline wander of the transmission line according to the accumulation result.

16 Claims, 8 Drawing Sheets

METHOD FOR COMPENSATING BASELINE WANDER OF A TRANSMISSION SIGNAL AND RELATED CIRCUIT

BACKGROUND OF INVENTION

1. Field of the Invention

The invention relates in general to a compensation method and related circuits for baseline wander of a transmission signal, and more particularly, to a method and related circuits to compensate baseline wander of a transmission signal by an accumulation result according to numbers of a plurality of pulses for different digital data.

2. Description of the Prior Art

With the development of an Internet communication system, people all over the world are capable of delivering lots of information to each other in high speed, and which improve the spread of knowledge and technology. Therefore it is extremely rewarding to maintain a high quality data transmission through the Internet, and it is also an enormous challenge for current engineers to focus research on a highly reliable communication system.

Figure 1:
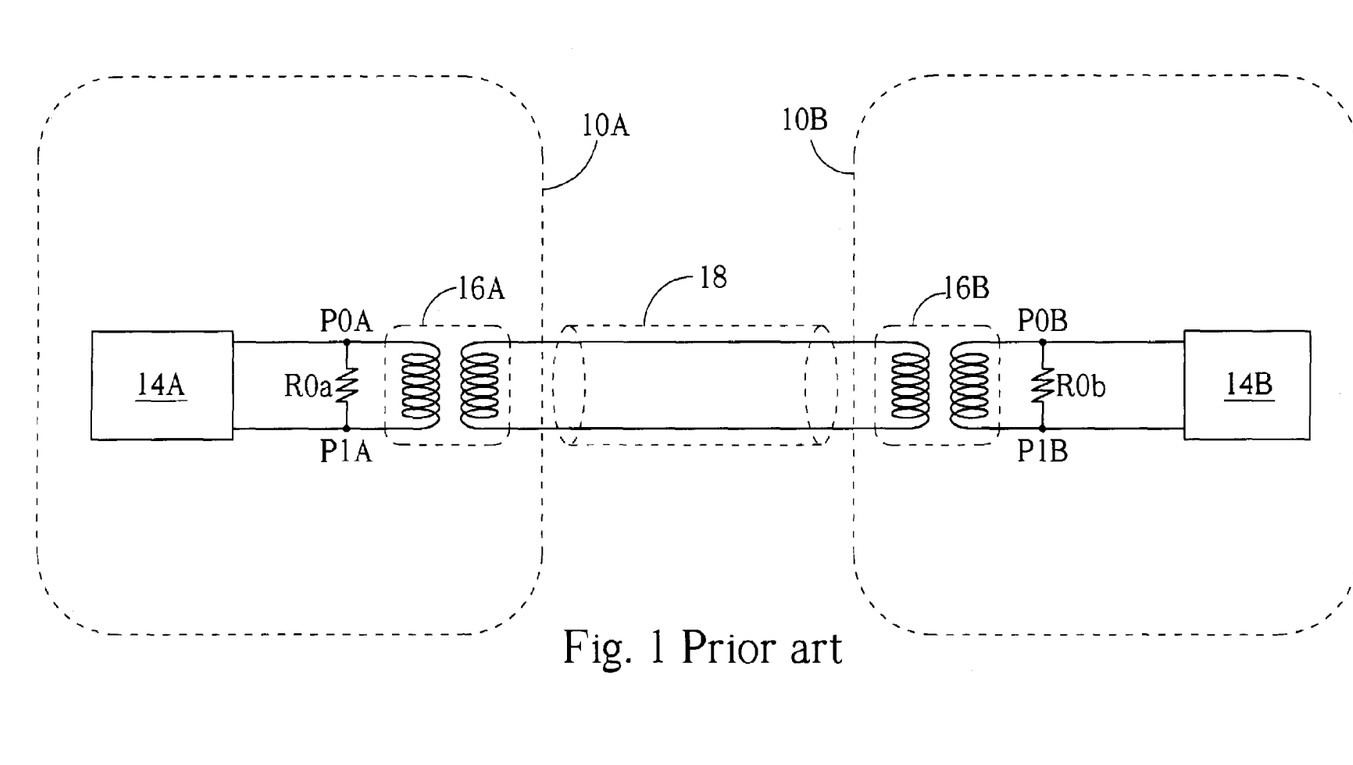
FIG. 1 shows a schematic diagram of a prior art data transmission system.

A schematic diagram for two user systems 10A and 10B to communicate through a transmission line 18 is shown in FIG. 1. Either one of the user systems could be a data switching system such as a circuit switching or a package switching system, a router, or a terminal. The transmission line 18 could be a network transmission line such as an Unshielded Twisted Pair (UTP) 5 of Ethernet. The user systems 10A and 10B comprise transformers 16A and 16B, and resistors R0a and R0b respectively to match the impedance of the transmission line 18. A transmitter 14A of the user system 10A generates a transmission signal with differential mode, which means the differential transmission signal comprises a positive and a negative transmission signal out of phase with each other. The positive and the negative transmission signals of the differential transmission signal are correlated to achieve a distant transmission through two connecting wires. The positive and the negative transmission signals of the differential transmission signal from transmitter 14A are output to node P0A and node P1A respectively and are coupled to the transmission line 18 by a transformer 16A. The differential transmission signals are then transmitted to the user system 10B by way of two connecting wires. Thereafter, the transmission signals are coupled to nodes P0B and P1B respectively by a transformer 16B and are received by the differential inputs of a receiver 14B. As a result, the user system 10A is able to transfer data to the other user system 10B through the transmission line 18.

However, there are some problems to be solved in the above described signal transmission process. For instance, although the transformers 16A and 16B are utilized to match the impedance of the transmission line 18, the feature of high pass filtering of transformers will diminish low frequency components of the transmission signals, which thus cause the voltage levels of the transmission signals to drift. Take an Ethernet network for example; some coding process such as MLT-3 coding must be done on the transmission signal for data transmission to the other user system before the signal is coupled to the transmission line by the transformer. After coding, there is a long-term average composed of composed of the low frequency component of the transmission signal. The amplitudes of low frequency components are related to the digital data with different levels in the transmission signal. When the transmission signal passes through the transformer 16A to the transmission line 18, the low frequency component of the transmission signal will be filtered by the transformer 16A which functions as a high pass filter. That is, the long-term average will be removed from the transmission signal. Thus, the baseline wander occurs at the other user system receiving the transmission signal.

Figure 2:
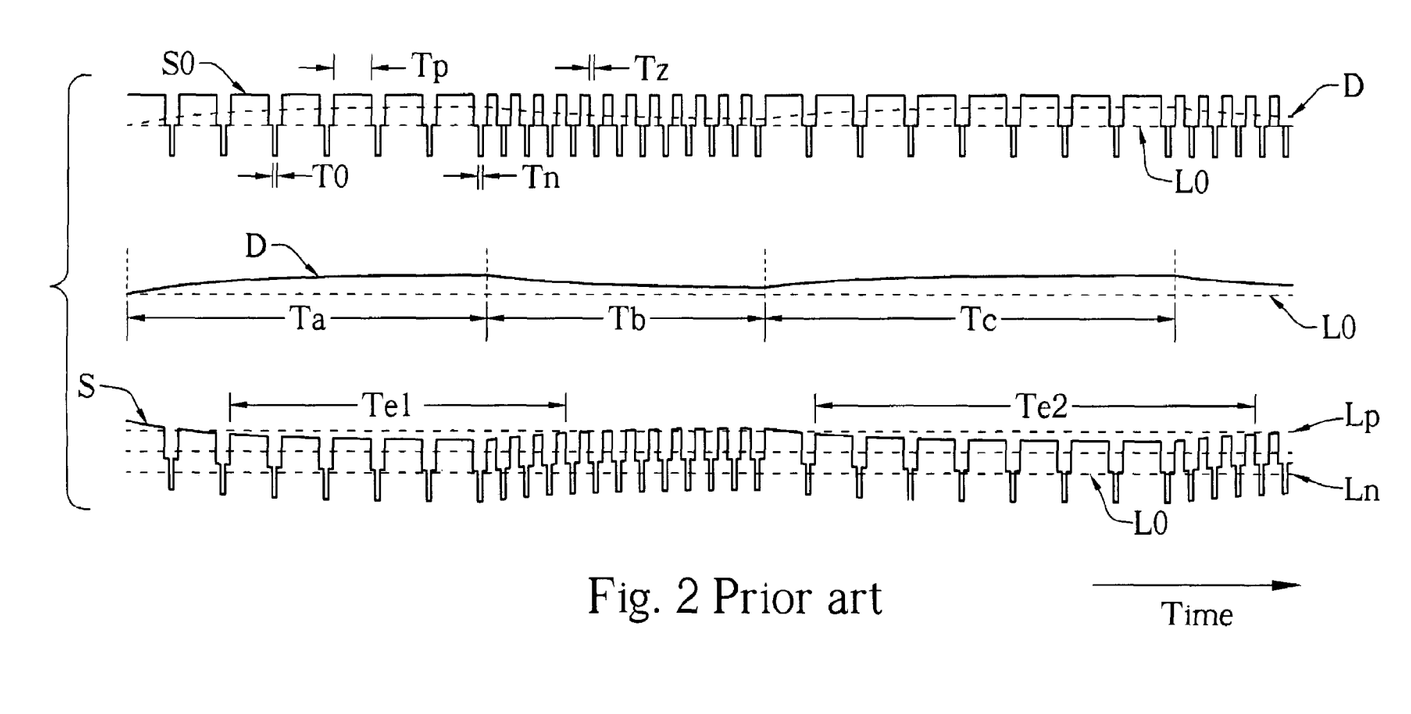
FIG. 2 shows waveforms of related signals due to baseline wander of a positive transmission signal according to the prior art.

Please refer to FIG. 2, which has a horizontal axis representing time. FIG. 2 shows a schematic diagram of level drifting of a receiving waveform due to the baseline wander of a transmission signal. While transmitting digital data from one user system 10A to the other user system 10B, the waveform of the transmission signal at node P0A is shown to be the waveform S0 in FIG. 2. Different digital data in the transmission signal is signified by three different kinds of pulses with different levels. For instance, during the duration Tp, there are first pulses with a plurality of high level periods, and the first pulses represent a plurality of digital data "1" in the transmission signal. During the duration Tn, there are second pulses with low level which represents digital data "−1" in the transmission signal. During the duration Tz, there are third pulses with zero level periods, i.e. level L0, which represents digital data "0" in the transmission signal. Therefore the digital data of the transmission signal is generated by coding the transmission signal waveform S0 utilizing three different types of pulses representing "1", "0", and "−1". After transmitting to node P0B through the transmission line 18 and transformers 16A and 16B, the long-term average of waveform S0 is shown to be a waveform D in FIG. 2 with a reference zero level L0 shown as a horizontal dashed line. During the duration Ta, since the number of first pulses with the high level is far larger than the number of second pulses with the low level, the long-term average of waveform S0 is getting higher and the waveform D increases gradually with time. The increasing waveform can be expressed by a mathematic formula of $(1-c \cdot \exp(t/T))$ wherein c is a proportional constant, T is a time constant, and exp is exponential function. In another situation, during the duration Tb, since the number of first pulses with the high level is about the same as the number of second pulses with the low level, the long-term average of waveform S0 is getting lower and the waveform D decreases gradually with time, in contrast to the duration Ta with the higher longer-term average. The decreasing waveform can be expressed by a mathematic formula of $\exp(t/T)$. Similarly, during the duration Tc, since the number of first pulses with the high level is again far larger than the number of second pulses with the low level, the long-term average of waveform S0 is again getting higher and the waveform D increases gradually with time, in contrast to the duration Tb with the lower longer-term average. The increasing waveform can again be expressed by a mathematic formula of $(1-c \cdot \exp(t/T))$.

As described above, the low frequency components comprising the long-term average of the transmission signal is filtered out while the transmission signal passes through the transformer 16A in one user system 10A and the transformer 16B in the other user system 10B. Hence, the received waveform of the transmission signal at node P0B in the user system 10B is actually the same as the waveform S shown in FIG. 2. In other words, waveform S can be obtained by subtracting the waveform D from the waveform S0. Because of the filter effect, the waveform D composed of the low frequency component is removed from the waveform S0. For that reason, The levels of the pulses of waveform S drift as shown in FIG. 2. The received waveform S appears waveform S0 carried by the waveform D. Therefore, the baseline wander occurs, and the digital data carried by the transmission signal cannot be retrieved correctly. Generally, the receiver 14B of the user system 12B retrieves the digital data from the series of pulses of waveform S based on criteria levels such as the levels of dashed line Lp and Ln shown in FIG. 2. Pulse levels higher than the voltage level Lp are represented by a digital "1" of a first pulse, and pulse levels lower than the voltage level Ln are represented by a digital "−1" of a second pulse. However, as the level wander of the pulses of waveform S occurs due to the baseline wander of the transmission signal at node P0B, the receiver 14B is not able to retrieve the digital data from the transmission signal correctly. For example, during the durations Te1 and Te2, due to the loss of low frequency components comprising the long-term average (i.e. waveform D), the downward offset of waveform S causes the levels of the first pulses to shift down below the voltage level Lp. For that reason, a wrong, interpretation of the first pulses, which are supposed to have higher pulse levels than voltage level Lp, occurs due to the baseline wander, and the data transmission is mistaken. Although the baseline wander phenomenon demonstrated in FIG. 2 is based on the positive transmission signal of the differential transmission signal transmitting from node P0A to node P0B, similar phenomenon happens to the negative transmission signal transmitting from node P1A to node P1B, as is well known to those skilled in the art.

SUMMARY OF INVENTION

It is therefore a primary objective of the claimed invention to provide a method and related circuits to compensate a level drifting of the transmission signal and to prevent the associated baseline wander effect while transmitting the transmission signal.

According to the claimed invention, a method for compensating a baseline wander effect imposed upon a transmission signal is provided. The transmission signal comprises a plurality of first pulses and a plurality of second pulses for representing digital data coded in the transmission signal. The method comprises generating an accumulation result according to a number of the first pulses and a number of the second pulses for estimating a long-term average variation of the transmission signal, and compensating the long-term average variation of the transmission signal according to the accumulation result.

According to the claimed invention, a signal compensation circuit for compensating a baseline wander effect imposed upon a transmission signal comprises a counter for generating an accumulation result according to a number of first pulses and a number of second pulses to estimate a long-term average variation of the transmission signal and generating corresponding control signals according to the accumulation result. The signal compensation circuit also comprises a correction circuit for compensating the transmission signal according to the control signals.

These and other objectives of the claimed invention will no doubt become obvious to those of ordinary skill in the art after reading the following detailed description of the preferred embodiment that is illustrated in the various figures and drawings.

DETAILED DESCRIPTION

Figure 3A:
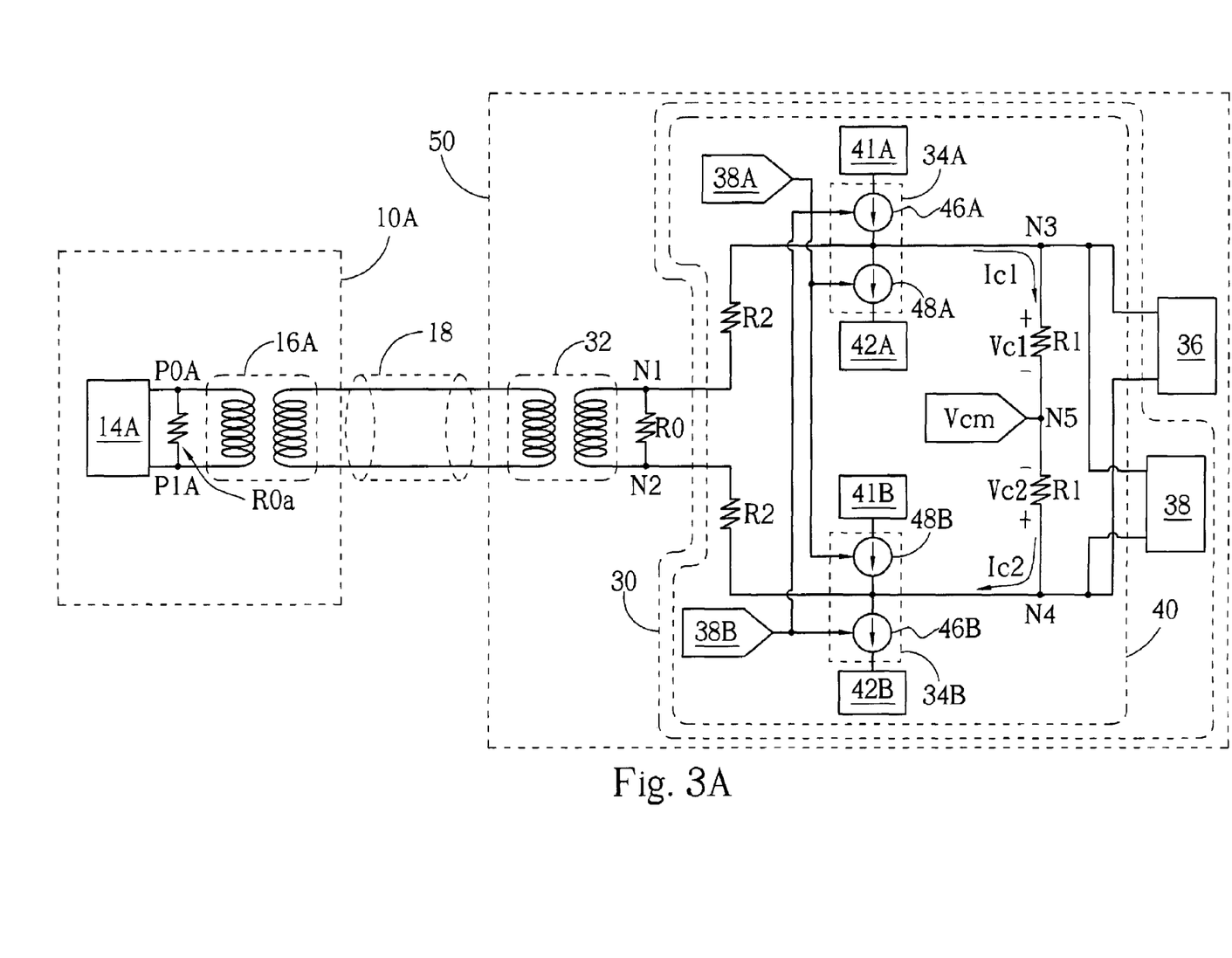
FIG. 3A shows a signal compensation circuit for a data transmission system between two user systems according to a first embodiment of the present invention.

In accordance with a first embodiment of the present invention, a signal compensation circuit 30 utilized for an network system is schematically shown in FIG. 3A. Two user systems 10A and 50 are connected to each other through a network transmission line 18. Either one of the user systems could be a terminal, a router, or a data switching system such as a circuit switching or a package switching system, and the transmission line 18 could be a network transmission line such as an Unshielded Twisted Pair (UTP) 5 for Ethernet. The transmitter 14A of the user system 10A is used for signal transmission, and the receiver 36 of the user system S0 is used for receiving signals. The user systems 10A and 50 comprise transformers 16A and 32 and impedance matching resistors R0$a$ and R0, respectively. A transmitter 14A of the user system 10A generates a differential transmission signal, in which the positive and negative transmission signals are provided on the transmission line 18 from nodes P0A and P1A respectively. The receiver 36 of the other user system is used to receive the differential transmission signal at nodes N3 and N4 from the transmission line 18.

In order to compensate the baseline wander of the transmission signal, such as an MLT-3 coding signal received by the receiver 36, the signal compensation circuit 30 is incorporated into the user system 50. The signal compensation circuit 30 comprises a control circuit 38 and a correction circuit 40. Based on the transmission signals at nodes N3 and N4, the control circuit 38 estimates the level drifting of the transmission signal and generates the corresponding control signals 38A and 38B. Thereafter, the correction circuit 40 is able to compensate the level drifting according to the control signals 38A and 38B from the control circuit 38. After the differential transmission signal is coupled to the transformer 32 of the user system 50, the positive and negative transmission signals are applied to the correction circuit 40 at the input nodes N1 and N2 respectively. As shown in FIG. 3A, there are two signal transmission paths related to the differential transmission signals. Two second resistors R2 and two current modules 34A and 34B are placed through the paths between nodes N1 and N3 and between nodes N2 and N4 respectively. Two first resistors R1 are connected between a common-mode voltage source Vcm and two nodes N3 and N4 respectively. Take an MLT-3 coding of 100 Base-T for example. The DC voltage supplied by the common-mode voltage source is 1.8V.

The current module 34A of the correction circuit 40 comprises a first pair of controlled current sources 46A and 48A with two suitable bias voltages supplied by a pair of bias circuits 41A and 42A. Similarly, the current module 34B of the correction circuit 40 comprises a second pair of controlled current sources 46B and 48B with two suitable bias voltages supplied by a pair of bias circuits 41B and 42B. Both the current amplitudes of the controlled current sources 48A and 48B are controlled by a control signal 38A generated by the control circuit 38, and both the current amplitudes of the controlled current sources 46A and 46B are controlled by a control signal 38B generated by the control circuit 38. With the aid of the first pair of controlled current sources 46A and 48A, a compensating current Ic1 is provided to node N3, and with the aid of the second pair of controlled current sources 46B and 48B, a compensating current Ic2 is provided to node N4. After the compensating current Ic1 flows through the first resistor R1 connected between nodes N3 and N5, a compensating voltage Vc1 is generated, and after the compensating current Ic2 flows through the first resistor R1 connected between nodes N4 and N5, a compensating voltage Vc2 is generated. While transmitting the differential transmission signal from nodes N1 and N2 to nodes N3 and N4, the voltage levels of the positive and negative transmission signals are droped through two second resistors R2 respectively. Based on the common-mode voltage Vcm as a central level reference and the second resistors R2 as loads, the voltage levels of the positive and negative transmission signals at N3 and N4 provide the compensating voltages Vc1 and Vc2 respectively. In accordance with a first preferred embodiment of the present invention, two current levels of the compensating currents Ic1 and Ic2 are substantially equal, in conjunction with the same resistance of two first resistors R1$s$, two voltage levels of the compensating voltages Vc1 and Vc2 are also equal. After the voltage compensation, the transmission signals at nodes N3 and N4 are input to the receiver 36 differentially.

Figure 3B:
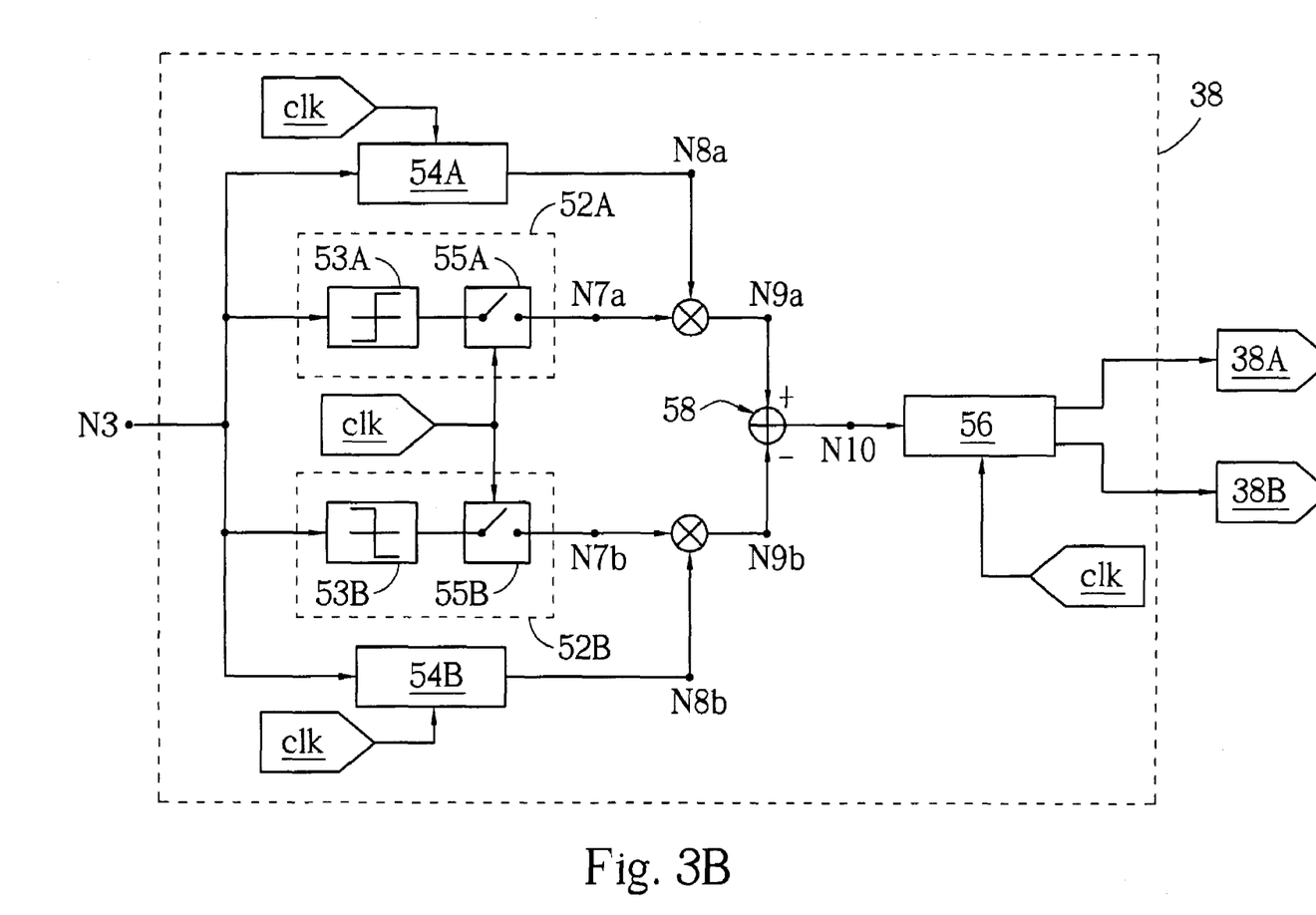
FIG. 3B shows a block diagram of a control circuit according to the first embodiment of the present invention.

The correction circuit 40 controls the correction timing and compensation quantity according to the control signals 38A and 38B from the control circuit 38. A block diagram of the control circuit 38 according to the present invention is shown in FIG. 3B. Henceforth the explanation of the operation of the control circuit 38 is based on the positive transmission signal of the differential transmission signal to generate the corresponding control signals 38A and 38B. Thus, the signal input to node N3 of the correction circuit 40 is the positive transmission signal. The control circuit 38 comprises two slicers 52A and 52B, two weighting adjustors 54A and 54B, and a counter 56. The control circuit 38 operates according to a clock clk. In accordance with the preferred embodiment of the present invention, the clock clk is synchronized with the transmission signal, with a period T0 shown in FIG. 2. The slicer 52A comprises a level trigger 53A and a sampler 55A. The level trigger 53A is triggered by the pulse of the transmission signal at node N3 when its voltage level is higher than a first triggering level, and the sampler 55A outputs the corresponding first triggering signal to node N7$a$ with reference to the clock clk. In the other way, the level trigger 53B is triggered by the pulse of the transmission signal at node N3 when its voltage level is lower than a second triggering level, and the sampler 55B outputs the corresponding second triggering signal to node N7$b$ with reference to the clock clk. Based on the voltage level of the transmission signal at node N3, the weighting adjustor 54A generates a corresponding first weighting value a1 at node N8$a$ and the weighting adjustor 54B generates a corresponding second weighting value a2 at node N8$b$. A first product of the first triggering signal at node N7$a$ and the first weighting value a1 at N8$a$ is output to node N9$a$. A second product of the second triggering signal at node N7$b$ and the second weighting value a2 at N8$b$ is output to node N9$b$. The adder 58 is utilized to subtract the second product from the first product and the subtracting result is fed to a counter 56 through node N10. According to the input at node N10, the counter 56 generates an accumulation result so as to generate control signals 38A and 38B according to the control signals 38A and 38B, the control circuit 38 controls the correction circuit 40 and compensates the level drifting of the transmission signals at nodes N3 and N4.

Figure 4A:
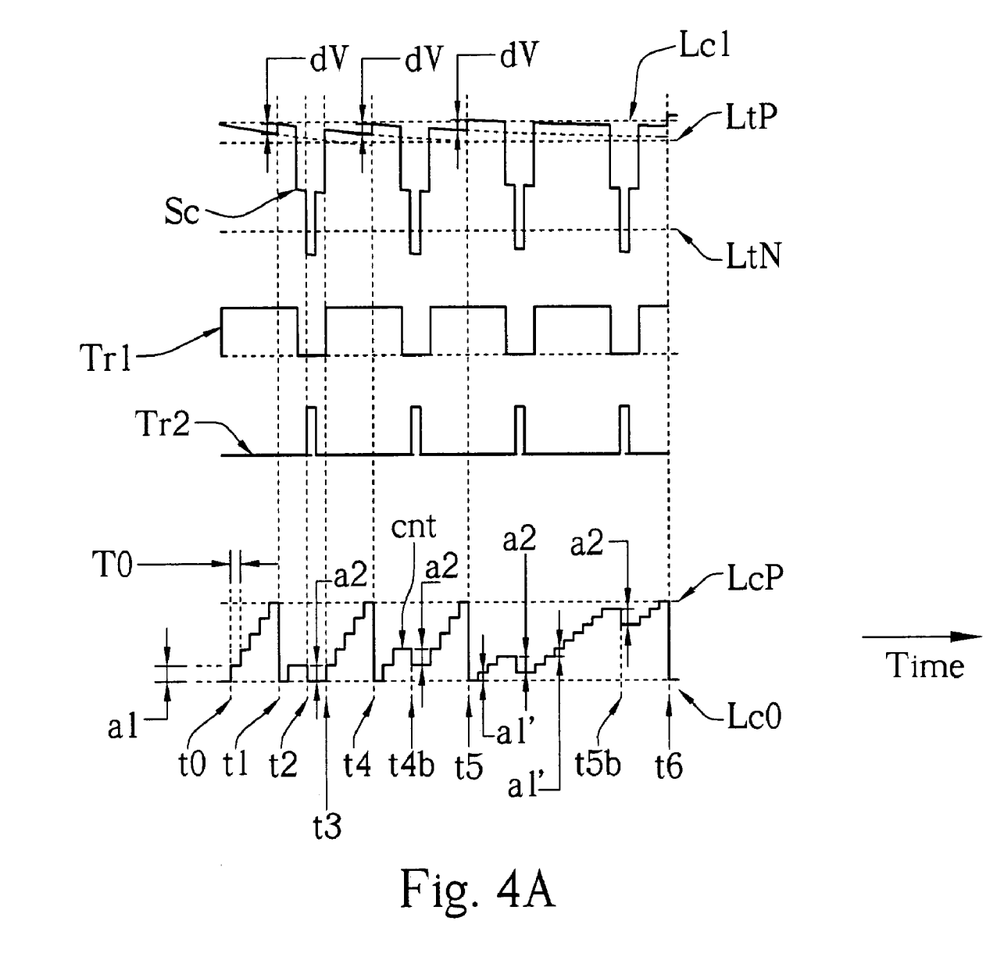
FIGS. 4A and 4B show related signal waveforms produced in operation of the signal compensation circuit according to the first embodiment of the present invention.
Figure 4B:
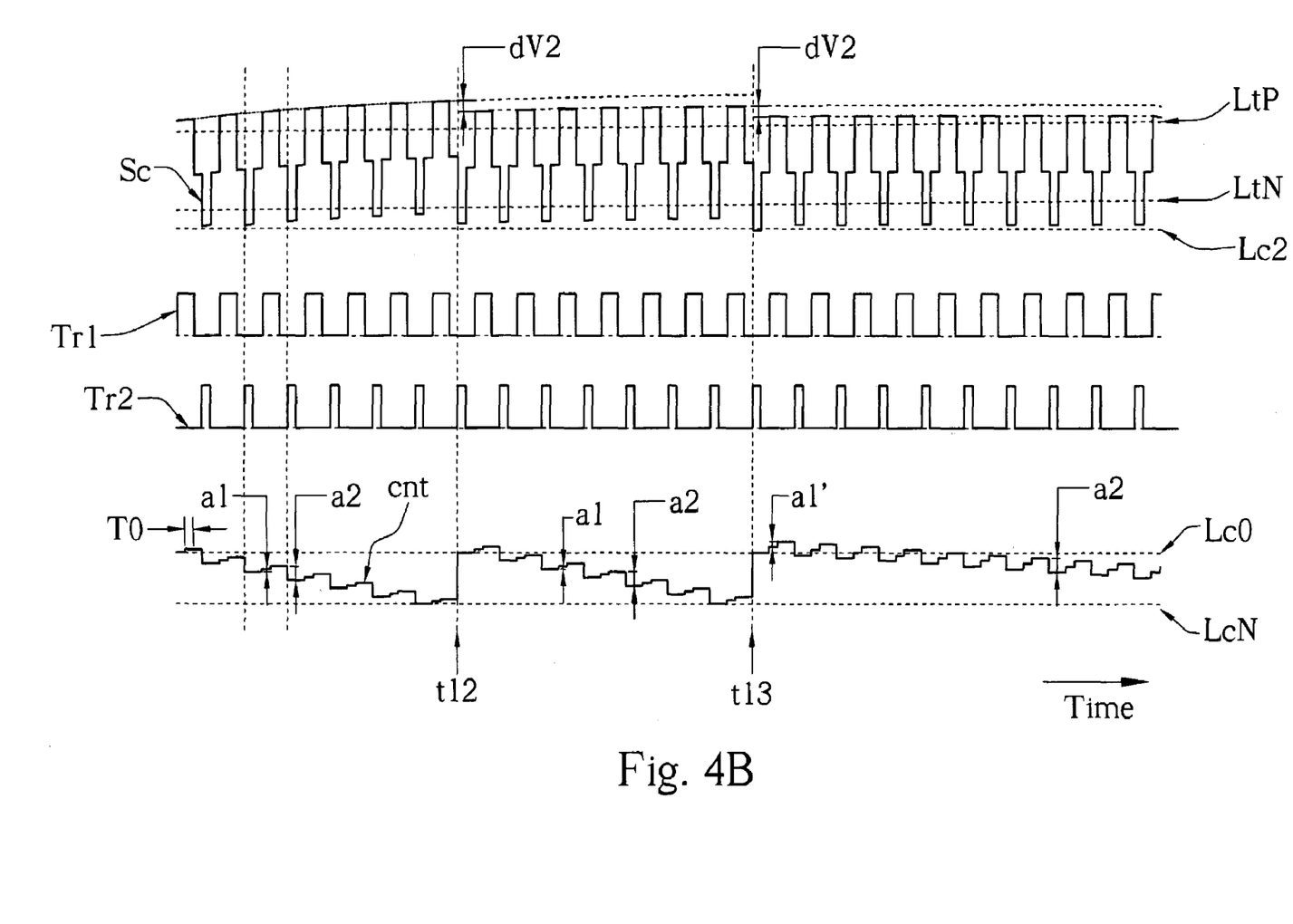

The timing diagrams of the related signals in the operation of signal compensation circuit 30 are shown in FIGS. 4A and 4B with time as the horizontal axis. Referring to FIG. 4A, clock diagrams, from top to bottom, are the transmission signal Sc at node N3, the first triggering signal Tr1 at node N7$a$, the second triggering signal Tr2 at node N7$b$, and the accumulation result cnt of the counter 56, respectively. As aforementioned, the slicer 52A generates the first corresponding triggering signal according to the transmission signal with voltage levels higher than the first pulse triggering value. A horizontal dashed line shown in FIG. 4A is the level of the first triggering value LtP. According to the clock clk, the first triggering signal Tr1 is high, which means digital "1", when the transmission signal Sc is higher than the first triggering value LtP. The waveform Tr1 is low, which means digital "0", when the transmission signal Sc is lower than the first triggering value LtP. Similarly, the slicer 52B generates the second corresponding triggering signal Tr2 according to the transmission signal with voltage level lower than the second pulse triggering value. With reference to the clock clk, the second triggering signal Tr2 is high when the transmission waveform Sc is lower than the second triggering value LtN, and the second triggering signal Tr2 is low when the transmission waveform Sc is higher than the second triggering value LtN. In this embodiment, the first triggering value LtP is defined according to high level of the first pulse. The duration of waveform Tr1 with the high level corresponds to the duration of the first pulse in the transmission signal Sc. Similarly, the second triggering value LtN is defined according to the low level of the second pulse. The duration of waveform Tr2 with the high level corresponds to the duration of the second pulse in the transmission signal Sc.

As described above, there are two products, with one product of the first triggering signal and the first weighting value a1 and the other product of the second triggering signal and the second weighting value a2. These two products are subtracted by an adder, and the subtracting result is applied to the counter 56 to generate an accumulation result, as shown by the waveform cnt in FIG. 4A. From time t0 to time t1, with reference to the clock clk and the transmission signal, the digital "1" of the waveform Tr1 is multiplied by the first weighting value a1 and the product is accumulated to the accumulation result of counter 56. As the waveform Tr1 continues to be high, the accumulation result increases with the triggering of clock clk and the increased amplitude of the accumulation result is equal to the first weighting value a1. In the same time duration from t0 to t1, waveform Tr2 is low, so there is no second pulse in this duration and the accumulation result is not affected by the second weighting value a2. When the accumulation result increases to the first predetermined value LcP, which is shown as a horizontal dashed line in FIG. 4A, the counter 56 will control the correction circuit 40 with the corresponding control signals 38A and 38B to increase the voltage level of transmission line at node N3 by a predetermined first compensation value dV. Referring to FIG. 4A, at time t1, as the waveform cnt increases the accumulation result to the first predetermined value LcP, the correction circuit 40 shifts up the waveform Sc by the control signal 38A with a predetermined value dV simultaneously. Meanwhile, as the accumulation result increases to the first predetermined value LcP, the accumulation result is reset to an initial value Lc0, which is also shown as a horizontal dashed line in FIG. 4A, and the counter 56 starts another counting cycle for the accumulation result to increase from initial value Lc0. For instance, at time t2, the slicer 52 decreases the accumulation result by the second weighting value a2, due to the digital "1" of waveform Tr2 triggered by the second pulses of waveform Sc. From time t3 to time t4, the waveform Tr1 is high and the accumulation result of counter 56 thus increases again with reference to the clock clk. At time t4, the accumulation result increases to the first predetermined value LcP again, and the counter 56 controls the correction circuit 40 with the control signals 38A and 38B to increase the voltage level of transmission line at node N3 by the first compensation value dV again. The accumulation result is also reset to the initial value Lc0.

From time t4 to time t5, the accumulation result of counter 56 increases by a first weighting value a1 in response to each digital "1" of waveform Tr1. However, at time t4b, the accumulation result decreases by a second weighting value a2 in response to digital "1" of waveform Tr2. At time t5, the accumulation result increases to the first predetermined value LcP, and the voltage level of transmission line Sc is thus increased by the first compensation value dV. As a result, according to the present invention, each time when the accumulation result is accumulated to the first predetermined value LcP, control circuit 38 will control the correction circuit 40 via the control signals 38A and 38B to compensate the transmission signal Sc.

In order to avoid over-correction, according to the present invention, as the voltage level of the waveform Sc of the transmission signal drifts to exceed the first threshold value Lc1, the weighting adjustor 54A reduces the first weighting value a1 based on a predetermined process. Referring to FIG. 4A, at time t5, the voltage level of the transmission signal Sc exceeds the first threshold value Lc1 after compensation, so the weighting adjustor 54A reduces the first weighting value a1 down to a new weighting value a1. Thereafter, the new weighting value a1 is the new increasing scale for the accumulation result to increase in response to the digital "1" of waveform Tr1. Consequently, as shown in FIG. 4A, after time t5, the increasing rate of the waveform cnt of accumulation result slows down, and the time required for accumulation result to reach the first predetermined value LcP is longer due to the smaller first weighting value a1. As a result, because of the longer time required for the accumulation result to reach the first predetermined value LcP, the time interval for the waveform Sc of the transmission signal to undergo a compensation process is longer and the possibility of over-correction is reduced. If the voltage level of the transmission signal is again over the first threshold value Lc1, the first weighting value a1 is further reduced, which causes even longer time duration for the accumulation result to reach the first predetermined value LcP and an even longer time interval for the waveform Sc of the transmission signal to undergo a compensation process. In accordance with a preferred embodiment of the present invention, the first weighting value a1 is decreased exponentially in each adjusting process. In other words, for instance, while in an nth adjusting process, the variation of first weighting value a1 can be expressed by $a1(n)=c*a1(n-1)$, wherein $a1(n)$ is the first weighting value a1 after the nth adjusting process, $a1(n-1)$ is the first weighting value a1 after an (n−1)th adjusting process, and c is a proportional constant less than one. In accordance with the first preferred embodiment, the second weighting value a2 holds fixed. As shown in FIG. 4A, at time t4b and at time t5b, the decreasing scales of accumulation result in response to the digital "1" of waveform Tr2 are the same as the second weighting value a2.

As aforementioned, the first pulses, corresponding to the high level of the transmission signal, cause the long-term average to increase gradually, which in turn causes the baseline of the transmission signal to decrease slowly. On the contrary, the second pulses, corresponding to the low level of the transmission signal, cause the long-term average to decrease gradually, which in turn causes the baseline of the transmission signal to increase slowly. Therefore, according to the present invention, the waveform Tr1 of the first triggering signal and the waveform Tr2 of the second triggering signal are utilized to generate an accumulation result according to a number of the first pulses and a number of the second pulses. As the number of first pulses increases, the number of digital "1" of the waveform Tr1 increases with time, and which corresponds to a gradual increase of the long-term average of the transmission signal. However, referring to FIG. 2 and the above related description, the transmission signal suffers the loss of the gradual increase of the long-term average at node N3 and the baseline of the waveform is shown to decrease gradually. In the meanwhile, a positive compensation is required for the corresponding transmission signal to shift the level up. The first weighting value a1 and the second weighting value a2 are used to estimate the variation slope of the long-term average drift of the transmission signal. The drifting scale of the long-term average is estimated by the product of the time duration and the corresponding slope. The time duration of increasing long-term average is set to the correlated number of digital "1" of waveform Tr1 and the rising slope is set to the correlated first weighting value a1. On the other hand, the time duration of decreasing long-term average is set to the correlated number of digital "1" of waveform Tr2 and the falling slope is set to the correlated second weighting value a2. The product of the rising time and the first weighting value a1 minus the product of the falling time and the second weighting value a2 equals the accumulation result of the counter 56, and the accumulation result is utilized to estimate the long-term average. Once the drifting value increases to some value, which means the baseline of the transmission signal is reduced by the same value, a positive compensation process is then required to shift up the level of the transmission signal. Therefore, according to the present invention, as the accumulation result increases to the first predetermined value LcP, a positive compensation process is applied to the waveform Sc of the transmission signal and shifts up the voltage level by a first compensation value dV. This invention discloses a corresponding relationship between the first compensation value dV and the first predetermined value LcP to compensate the baseline wander of the transmission signal correctly and efficiently.

As aforementioned, the slope of the variation of baseline is not fixed and is actually dependent on time. Referring to the waveform D in FIG. 2, during time intervals Ta and Tc, the increasing rate is higher at the beginning of each interval, which means the slope is higher due to the larger increasing scale per unit time. While near the end of each interval, the increasing rate is lower, which means the slope is lower due to the smaller increasing scale per unit time. According to the present invention, the first weighting value a1 and the second weighting value a2 corresponding to the slopes of long-term average variation are changing correspondingly.

For example, as described above, when the accumulation result increases to the first predetermined value LcP, a positive compensation process is applied to the transmission signal. However, if over-correction occurs, which means the slope is not estimated correctly by the first weighting value a1 and the second weighting value a2, the first weighting value a1 and the second weighting value a2 are then adjusted to reflect the variation slope of long-term average with time. Based on the above description, the slope of rising or falling long-term average varies exponentially. According to the present invention, the suitable adjustment of the first weighting value a1 is sufficient to reflect the variable slope with time, and the second weighting value a2 can be held fixed to simplify the circuit design and control process of control circuit 38. When the voltage level of waveform Sc of the transmission signal is higher than the first threshold value Lc1, the weighting adjustor 54A reduces the first weighting value a1 exponentially and adjusts the estimation of the slope of long-term average. If the voltage level of the transmission signal goes beyond the first threshold value due to over-correction, the first weighting value a1 is adjusted to be smaller and the variation of accumulation result is slower, which means frequent corrections are not required for a smoother slope of the transmission signal. Each time the transmission signal exceeds the first threshold value Lc1, the first weighting value a1 is further reduced to reflect the smoother slope of the long-term average.

The waveforms of the related signals in another embodiment are illustrated with reference to the same time scale along the horizontal axis in FIG. 4B. Referring to FIG. 4B, waveforms from top to bottom are the transmission signal Sc, the first triggering signal Tr, the second triggering signal Tr2, and the accumulation result cnt. Compared to the operation process in FIG. 4A, the number of the first pulses corresponding to the high level of the transmission signal Sc is about the same as the number of the second pulses corresponding to the low level of the transmission signal Sc. This causes the baseline waveform to decrease gradually derived from the above discussion on the waveforms in FIG. 2. As before, the accumulation result increases a scale of the first weighting value a1 with each digital "1" of waveform Tr1 and decreases a scale of the second weighting value a2 with each digital "1" of waveform Tr2. Compared to the waveforms in FIG. 4A, the number of digital "1" of waveform Tr1 is relatively smaller and the number of digital "1" of waveform Tr2 is relatively greater, which causes the accumulation result to decrease gradually and even decrease to less than the initial value Lc0. As the accumulation result decreases gradually to a second predetermined value LcN, which is shown as a horizontal dashed line in FIG. 4B, the counter 56 resets the accumulation result to the initial value Lc0 and the correction circuit 40 shifts down the waveform level of the transmission signal with a scale of the second compensation value dV2 according to the control signals 38A and 38B. The gradual decrease of accumulation result from initial value Lc0 means the gradual decrease of long-term average, which corresponds to a gradual increase of waveform Sc of the transmission signal. Therefore, according to the present invention, as the accumulation result decreases to the second predetermined value LcN, a shift-down compensation process is applied to the waveform Sc. For instance, at time t12 and t13, as the accumulation result decreases to the second predetermined value LcN, the voltage level of waveform Sc of the transmission signal is shifted down with a scale of the second compensation value dV2.

Similar to the feature in FIG. 4A, the decreasing rate of the long-term average is smaller with time and the upward offset rate of waveform Sc is also smaller, which means frequent downward corrections will cause over-compensation on waveform Sc. Hence, the weighting adjustor 54A is utilized to adjust the first weighting value a1 to reflect the variation of long-term average with time. For instance, as the voltage level of waveform Sc of the transmission signal is lower than the predetermined threshold value Lc2, the weighting adjustor 54A increases the first weighting value a1 to prevent the variation of the long-term average with time. Referring to FIG. 4B, at time t13, as the waveform Sc decreases to the second threshold value Lc2, the first weighting value a1 will increase from a1 to a1", accordingly. Thereafter, the time duration for the waveform Sc to decrease to the second predetermined value LcN is longer and the frequency of downward correction of the transmission signal is lower to reflect the slower ascending of the transmission signal.

Based on the above discussion with reference to FIGS. 4A and 4B, according to the present invention, the accumulation result increases a scale of the first weighting value a1 with each first pulse and decreases a scale of the second weighting value with a2 each second pulse, and the rising or falling level of the transmission signal is estimated by the accumulation result. As the accumulation result reaches the first predetermined value LcP, the correction circuit 40 is controlled by the counter 56 to shift up the voltage level of the transmission signal with a scale of first compensation value dV, so as to compensate the downward offset of the transmission signal. As the accumulation result reaches the second predetermined value LcN, the correction circuit 40 is controlled by the counter 56 to shift down the voltage level of the transmission signal with a scale of second compensation value dV2, so as to compensate the upward offset of the transmission signal. In addition, as the voltage level of the transmission signal increases to exceed the first threshold value Lc1, the weighting adjustor 54A will reduce the first weighting value a1 to reflect the slower ascending of the transmission signal. On the contrary, as the voltage level of the transmission signal decreases to fall below the second threshold value Lc2, the weighting adjustor 54A will increase the first weighting value a1 to reflect the slower descending of the transmission signal.

Figure 5:
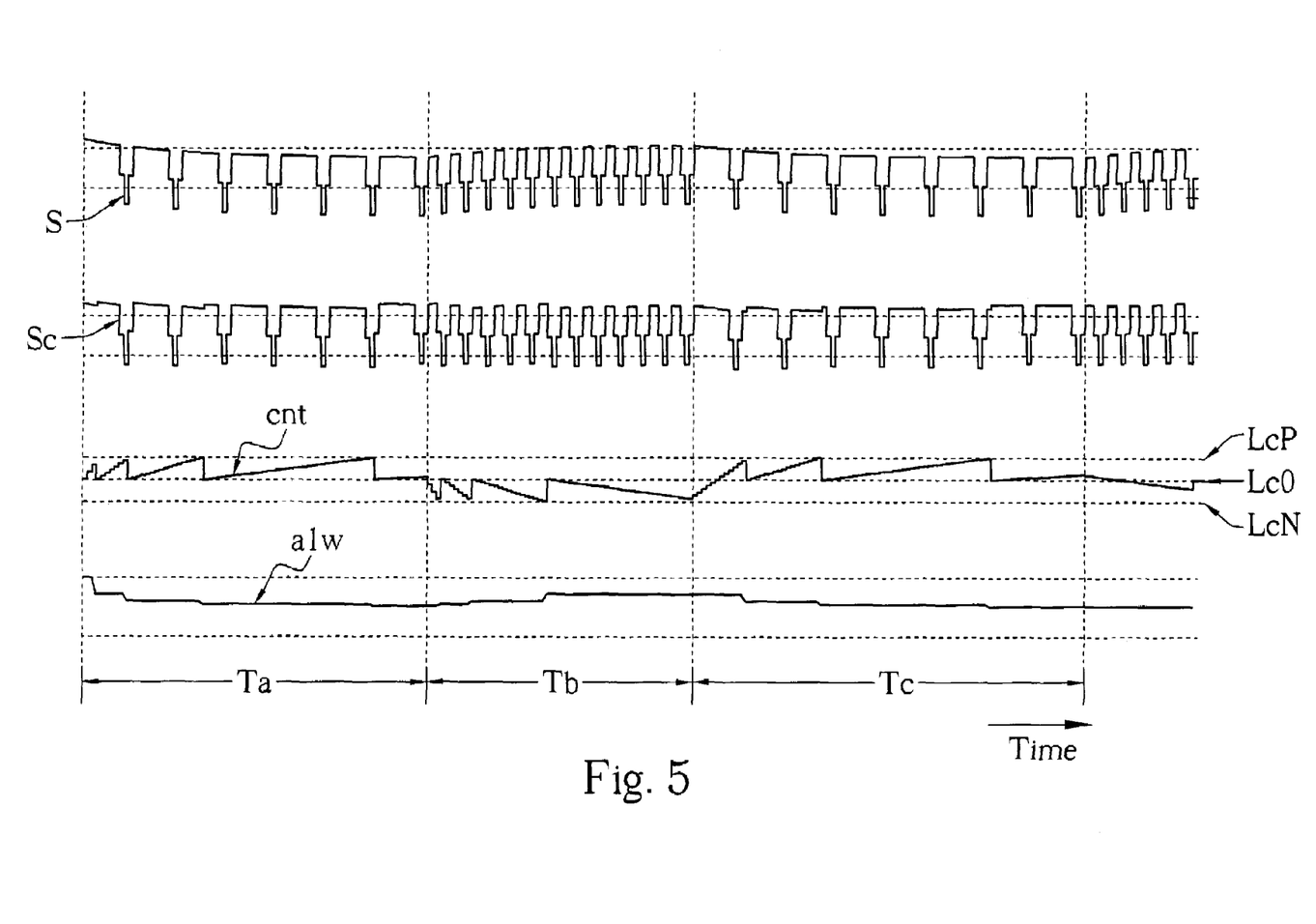
FIG. 5 shows waveforms of related signals produced in operation of the signal compensation circuit according to the first embodiment of the present invention.

The waveforms of the related signals in the operation of signal compensation circuit 30 are illustrated in FIG. 5 with an expanded time scale along the horizontal axis. Referring to FIG. 5, the waveforms, from top to bottom are the uncompensated transmission signal S, the transmission signal Sc under compensation by the present invention, the accumulation result cnt, and the waveform alw of the first weighting value a1. Referring to FIG. 5, during the time interval Ta, because of the baseline offset of the transmission signal, the uncompensated waveform S is drifting downward. Since the number of the first pulses is much larger than the number of the second pulses, the accumulation result is counting up rapidly in response to a larger long-term average, in conjunction with a larger initial scale of the first weighting value a1, and the accumulation result increases to the first predetermined value LcP in short time. Consequently, the correction circuit 40 shifts up the voltage level of the transmission signal frequently under the control of the counter 56. However, as the initial larger scale compensation turns out to be over-compensation afterward, the first weighting value a1 is decreased accordingly to lower the increasing rate of the accumulation result as shown by waveform alw in FIG. 5, and which reflects the smoother downward offset of the transmission signal. Thereafter, during the time interval Tb, because the number of the first pulses is about the same as the number of the second pulses and the initial scale of the first weighting value a1 is adjusted to be smaller during time interval Ta, the accumulation result is counting down in response to a lower long-term average, and thus decreases down to the second predetermined value LcN from the initial value Lc0 in short time. Consequently, the correction circuit 40 shifts down the voltage level of the transmission signal frequently under the control of the counter 56. However, as the initial larger scale compensation turns out to be over-compensation afterward, the first weighting value a1 is increased accordingly to lower the decreasing rate of the accumulation result, and which reflects the smoother upward offset of the transmission signal.

According to the first embodiment, each of the controlled current sources comprises a plurality of current units, and each current unit provides a constant unit current, a current d1 for example. The controlled current source is able to increase the output current by enabling a plurality of current units and decrease the output current by disabling partial current units. While the control circuit 38 controls the correction circuit 40 to increase or decrease the voltage level of the transmission signal, two control signals 38A and 38B are utilized to control the controlled current sources 46A, 46B, 48A, and 48B as shown in FIG. 3A. In order to increase the voltage level of the transmission signal at node 3, a plurality of current units of controlled current sources 46A and 46B are enabled to increase the compensating current Ic1 and Ic2 by a current dI. In conjunction with the reference level of the common-mode voltage source Vcm, the voltage level of the transmission signal at node N3 is increased by a scale of R1*dI. As aforementioned, according to the present invention, while compensating the transmission signal, the voltage level of the transmission signal is increased by the first compensation value dV. For that reason, the first compensation value dV can be designed and controlled by the first resistor R1 and the current d1. Similarly, in order to decrease the voltage level of the transmission signal at node 3, a plurality of current units of controlled current sources 48A and 48B are enable to decrease the compensating current Ic1 and Ic2 by a current dI2. In conjunction with the reference level of the common-mode voltage source Vcm, the voltage level of the transmission signal at node N3 is decreased by a scale of R1*dI2. Consequently, the second compensation value dV2 can be designed and controlled by the first resistor R1 and the current dI2. In a preferred embodiment, the first compensation value dV and the second compensation value dV2 are substantially equal and the two currents dI and dI2 are also substantially equal.

Figure 6:
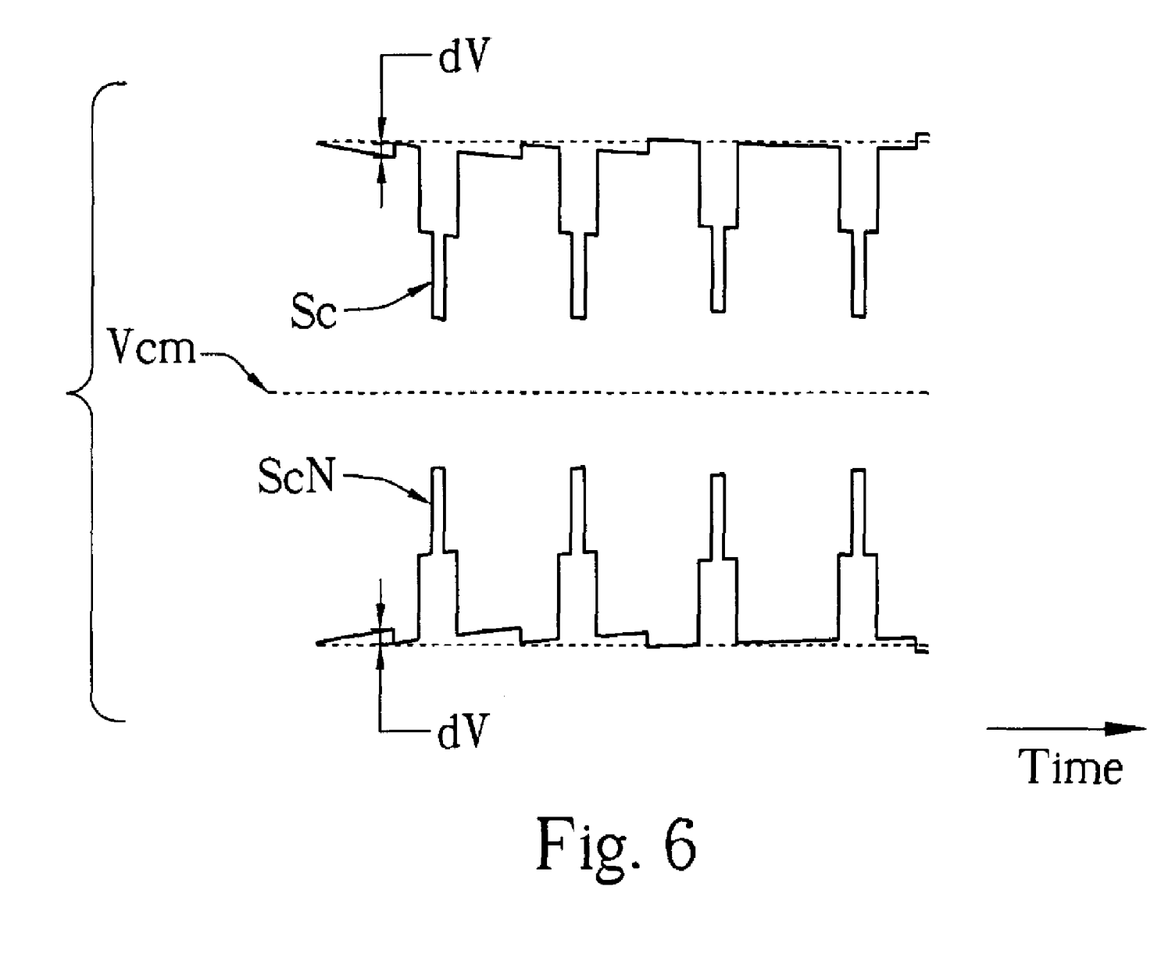
FIG. 6 shows positive and negative waveforms of a differential transmission signal under compensation of the signal compensation circuit according to the present invention.

Although the above discussion is based on the positive transmission signal at N3, it is noteworthy that similar compensation process can be inferred by persons skilled in the art for the negative transmission signal at N4 due to the symmetrical circuit design of the correction circuit 40. The positive and negative waveforms Sc and ScN of the differential transmission signal under the compensation of signal compensation circuit 30 are schematically graphed to the same time scale along the horizontal axis as shown in FIG. 6. The waveform Sc is the positive waveform of the transmission signal at node N3 and the waveform ScN is the negative waveform of the transmission signal at node N4. Two second resistors R2s, two first resistors R1s, and the related controlled current sources are placed symmetrically based on the central position of the common-mode voltage source Vcm in the correction circuit 40 as shown in FIG. 3A. Accordingly, the positive and negative waveforms of differential transmission signal 18 at nodes N3 and N4 are mirrored to each other based on the central level of common-mode voltage Vcm, which is shown as a horizontal dashed line marked Vcm in FIG. 6. Referring to FIG. 6, as the output currents of the controlled current sources 48A and 48B are increased under the control of control signal 38B, the compensation currents Ic1 and Ic2 are reduced and the compensation voltages Vc1 and Vc2 across the two first resistors R1s are also reduced, and the two compensation voltages Vc1 and Vc2 with equal scale but out of phase are applied to the compensation processes of waveform Sc and waveform ScN respectively. As a result, according to the present invention, it is able to diminish the baseline wander of differential transmission signal by the compensation process described above and the receiver 36 of the user system 50 can retrieve the digital data from the transmission signal correctly.

As aforementioned, according to the first embodiment, with the second weighting value a2 fixed, the first weighting value a1 varies to reflect the rising or falling of waveform D. In a second embodiment of the present invention, the situation is reversed. With the first weighting value a1 fixed, the second weighting value a2 varies to reflect the rising or falling of the waveform D. Compared to the first embodiment, the increase of the second weighting value a2 in the second embodiment corresponds to the decrease of the first weighting value a1 in the first embodiment, and vice versa.

Compared to the prior art without the compensation process, the digital data cannot be retrieved correctly from the transmission signal with baseline wander. In the present invention, the baseline wander is estimated with the aid of an accumulation result by a counter and is corrected with a compensation process to ensure a high quality signal transmission. Thereby, a highly reliable communication system is achieved for data transmission and knowledge spreading.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for compensating a baseline wander of a transmission signal, the transmission signal comprising a plurality of first pulses and a plurality of second pulses for representing digital data coded in the transmission signal; the method comprising:
   (a) generating an accumulation result according to a number of the first pulses and a number of the second pulses for estimating the baseline wander of the transmission signal; and
   (b) compensating the baseline wander of the transmission line according to the accumulation result;
   wherein when the number of the first pulses is increased by one, the accumulation result is increased by a first weighted value accordingly, and when the number of the second pulses is increased by one, the accumulation result is decreased by a second weighted value accordingly;
   wherein when a voltage level of the transmission signal is greater than a first threshold value, the first weighted value is decreased, and when the voltage level of the transmission signal is less than a second threshold value, the first weighted value is increased;
   wherein when the voltage level of the transmission signal is greater than the first threshold value, the second weighted value is increased, and when the voltage level of the transmission signal is less than the second threshold value, the second weighted value is decreased.

2. The method of claim 1 wherein step (b) further comprises resetting the accumulation result to an initial value after compensating the transmission signal.

3. The method of claim 1 wherein a voltage level of each first pulse is greater than a voltage level of each second pulse, the accumulation result is increased when the number of the first pulses increases, and the accumulation result is decreased when the number of the second pulses increases.

4. The method of claim 3 wherein when compensating the transmission signal, the voltage level of the transmission signal is increased by a first compensation value when the accumulation result is greater than a first predetermined value, and the voltage level of the transmission signal is decreased by a second compensation value when the accumulation result is less than a second predetermined value.

5. The method of claim 1 wherein the first weighted value is increased exponentially and is decreased exponentially.

6. The method of claim 1 wherein compensating the baseline wander of the transmission line according to the accumulation result comprises dynamically increasing or decreasing a compensating current for compensating the transmission signal according to the accumulation result.

7. The method of claim 6 wherein dynamically increasing the compensating current for compensating the transmission signal according to the accumulation result comprises selectively turning on a plurality of first unit current sources according to the accumulation result for generating the compensation current, and dynamically decreasing the compensating current for compensating the transmission signal according to the accumulation result comprises selectively turning on a plurality of second unit current sources according to the accumulation result for generating the compensation current.

8. A signal compensation circuit for compensating a baseline wander of a transmission signal; the transmission signal comprising a plurality of first pulses and a plurality of second pulses for representing digital data coded in the transmission signal; the signal compensation circuit comprising:
  a counter for generating an accumulation result according to a number of the first pulses and a number of the second pulses to estimate the baseline wander of the transmission signal and generating a corresponding control signal according to the accumulation result;
  a correction circuit for compensating the transmission signal according to the control signal; wherein when the number of the first pulses is increased by one, the counter increases the accumulation result by a first weighted value accordingly, and when the number of the second pulses is increased by one, the counter decreases the accumulation result by a second weighted value accordingly; and
  a weighted value adjuster for determining the first weighted value, wherein when a voltage level of the transmission signal is greater than a first threshold value, the weighted value adjuster decreases the first weighted value; and when the voltage level of the transmission signal is less than a second threshold value, the weighted value adjuster increases the first weighted value;
  wherein when the voltage level of the transmission signal is greater than the first threshold value, the weighted value adjuster increases the second weighted value, and when the voltage level of the transmission signal is less than the second threshold value, the weighted value adjuster decreases the second weighted value.

9. The signal compensation circuit of claim 8 wherein the counter resets the accumulation result to an initial value after the correction circuit compensates the transmission signal.

10. The signal compensation circuit of claim 8 wherein a voltage level of each first pulse is greater than a voltage level of each second pulse, the counter increases the accumulation result when the number of the first pulses is increased; and the counter decreases the accumulation result when the number of the second pulses is increased.

11. The signal compensation circuit of claim 10 wherein when the correction circuit compensates the transmission signal, the correction circuit increases the voltage level of the transmission signal by a first compensation value according to the corresponding control signal when the accumulation result is greater than a first predetermined value; and the correction circuit increases the voltage level of the transmission signal by a second compensation value according to the corresponding control signal when the accumulation result is less than a second predetermined value.

12. The signal compensation circuit of claim 8 wherein the weighted value adjuster exponentially adjusts the first weighted.

13. The signal compensation circuit of claim 8 further comprising a slicer for counting the number of the first pulses.

14. The signal compensation circuit of claim 13 wherein the slicer comprises a trigger and a sampler.

15. The signal compensation circuit of claim 8 further comprising a slicer for counting the number of the second pulses.

16. The signal compensation circuit of claim 8 wherein compensating the transmission signal according to the control signal comprises selectively turning on a plurality of first unit current sources according to the control signal for increasing a compensation current for compensating the transmission signal and comprises selectively turning on a plurality of second unit current sources according to the control signal for decreasing the compensation current for compensating the transmission signal.

* * * * *